Jan. 26, 1937.  G. E. SMITH  2,068,996
SHOCK ABSORBER
Filed March 14, 1935  2 Sheets-Sheet 1
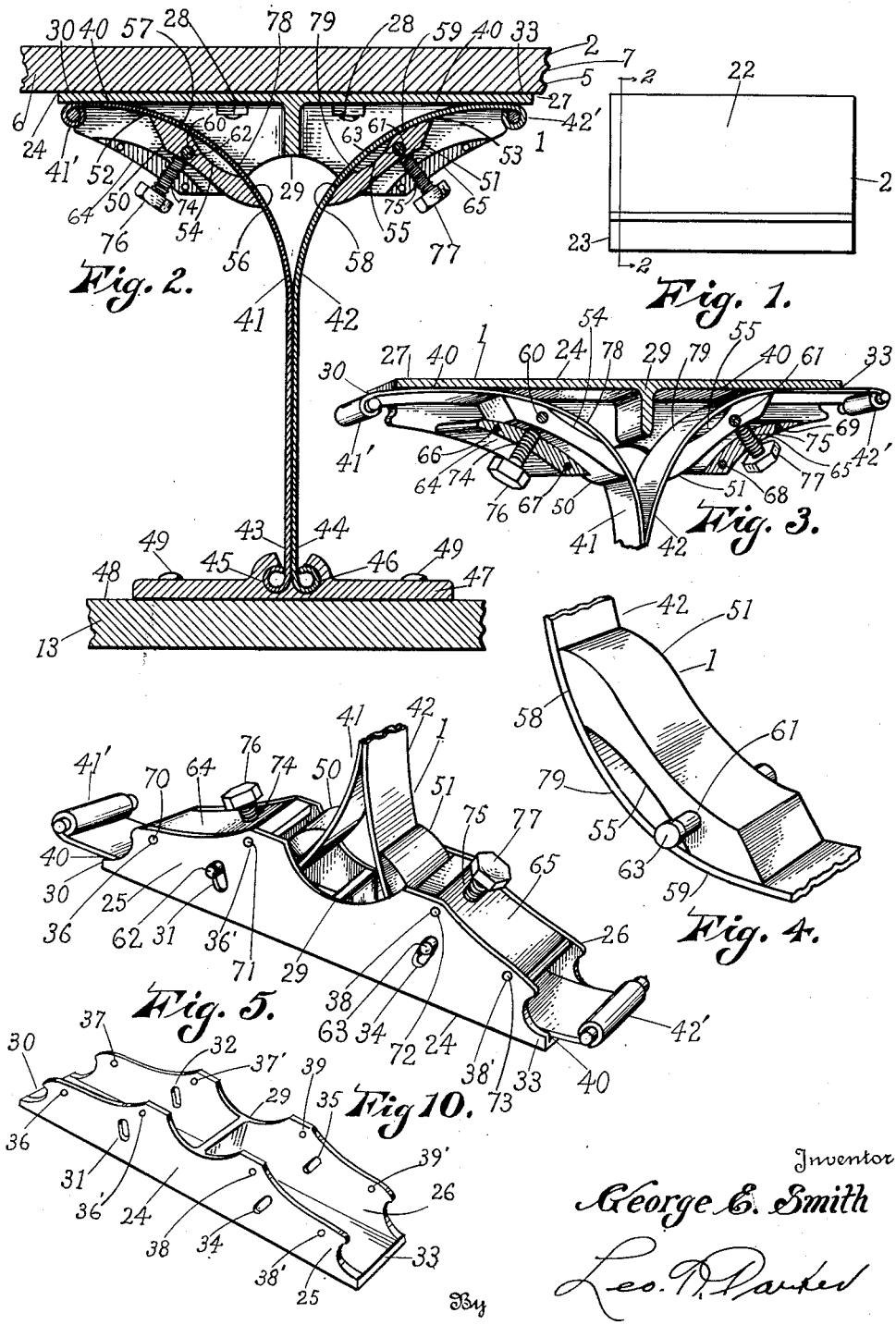
Inventor
George E. Smith
Leo P. Parker
By
Attorney

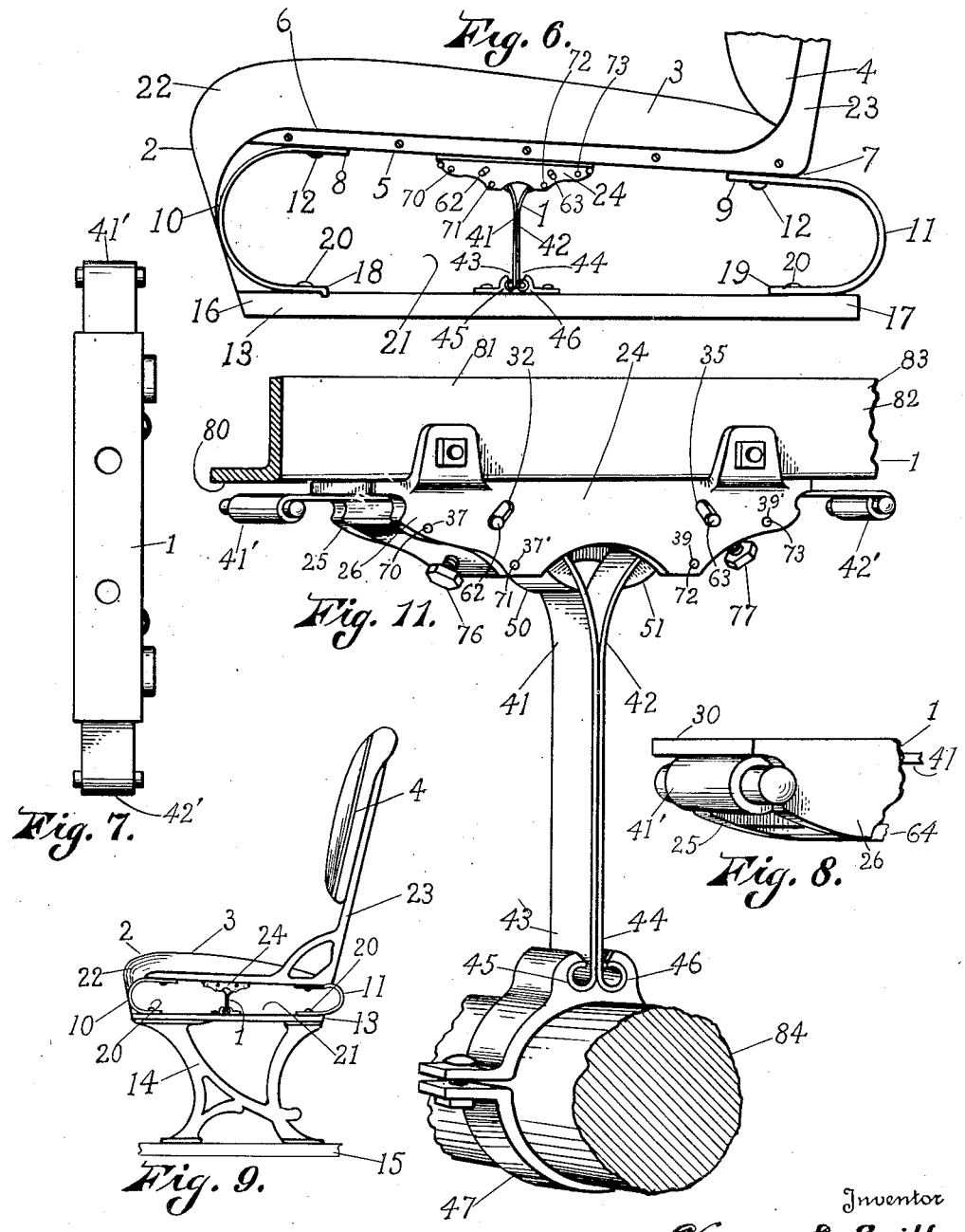

Patented Jan. 26, 1937

2,068,996

UNITED STATES PATENT OFFICE 2,068,996

SHOCK ABSORBER

George E. Smith, Cincinnati, Ohio

Application March 14, 1935, Serial No. 11,081

14 Claims. (Cl. 188—129)

The invention relates to shock absorbers particularly, although not exclusively, adapted for utilization in combination with vehicle seats, chassis springs, and the like.

Complaints of discomfort by occupants of automobiles, particularly passenger automobiles, which travel rapidly over the highways are numerous, because a relatively great number of vertical shocks are produced by comparatively small elevations and depressions in the roadway. This is true although the vehicles are equipped with modern equipment, such as pneumatic tires, efficient springs, and the like. In other words, a great majority of vibrations and shocks imparted to the vehicle are not absorbed by the chassis spring construction, and the tires. For this reason it is necessary, in order to insure greater comfort to the occupants of motor vehicles, that a seat accessory shall be provided which is particularly adapted to retard the upward and downward movements of the seat, as well as absorb the shocks and vibrations imparted to said seat as a result of inefficient operation of the chassis spring construction, and pneumatic tires of the vehicle, and also to provide efficient means to lessen or break the vibrations of the vehicle body imparted by the chassis springs. Obviously, under various circumstances the above mentioned disadvantages apply to different kinds of other vehicles, such as steam and electric railway passenger coaches, motor coaches, and the like.

Therefore, an important object of the invention is to provide a simple, efficient and practical and economical means particularly adapted to absorb vibrations and shocks of motor vehicle bodies, seats, and the like.

Other objects of the invention are to provide a shock absorber particularly adapted for utilization in motor vehicle seats and chassis spring construction irrespective of the weight or size of said vehicle; and to provide a shock absorber having manually operative adjustments which may be quickly and conveniently adjusted to vary the force required to produce a predetermined movement of a part of said absorber in a given period of time.

The invention consists in the combination of the elements, arrangement of the parts and in the details of the construction, as hereinafter fully explained.

In the drawings:

Fig. 1 is a plan view of a seat;

Fig. 2 is a section on line 2—2 in Fig. 1;

Fig. 3 is a perspective view of the invention, with parts broken away;

Fig. 4 is a perspective view of the invention, with parts broken away and parts removed;

Fig. 5 is a perspective view of the invention, with parts broken away;

Fig. 6 is a side elevation of a seat;

Fig. 7 is a plan view of the invention;

Fig. 8 is an enlarged and perspective view of the invention, with parts broken away;

Fig. 9 is a side elevation view of a seat;

Fig. 10 is a perspective view of the frame; and

Fig. 11 is a perspective view showing a modification of the invention.

The preferred construction of the shock absorber 1, is exemplified, in Figs. 1 to 10, in combination with the vehicle seat 2 which comprises the seat part 3 and the back rest 4. The seat part 3 comprises the inflexible seat board 5 which is inclined forwardly and upwardly and has connected to the lower surface of its front and rear ends 6 and 7 the upper ends 8 and 9 of the front and rear outwardly curved steel spring sheets 10 and 11, as by the bolts 12.

The horizontal inflexible support 13 is spaced vertically from the seat board 5 and is supported by any suitable support, such as the legs 14 on the motor vehicle 15. Fixed to the upper surface of the front and rear ends 16 and 17, of the support 13, are the lower ends 18 and 19, respectively, of the sheets 10 and 11, as by the bolts 20.

The front spring sheet 10 has greater depth and less thickness of the material, from which it is formed, than the rear spring sheet 11, whereby the relatively great depth causes the seat board 5 to be inclined forwardly and upwardly with respect to the horizontal support 13. The spring sheets 10 and 11 extend from one side edge to the other side edge of the seat board 5, and a space 21 is between the seat board 5, support 13, and the springs 10 and 11.

Suitably fixed to the upper surface of the seat board 5 is the cushion 22 which may be formed from any suitable material. Integrally formed with the rear end 7, of the seat board 5, is the inflexible back board 23 which extends at right angles to the seat board.

Fixed to the lower surface 5' of the seat board 5 is the channel frame 24, or receiving member, having the vertical and downwardly extending and spaced apart sides or side plates 25 and 26 extending parallel with each other and at right angles with the horizontal top 27 which is integrally formed with the upper edges of the side plates. The bolts 28 are received through the top 27 and secure the frame to the seat board. The web 29 is integrally formed with the top 27 and the side plates 25 and 26 for the purpose of reenforcing the frame 24.

Formed in the side plates 25 and 26 at the end 30, of the frame, are the slots 31 and 32 whose walls extend a slight degree out from the vertical. Formed in the side plates 25 and 26, at the end 33 of the frame, are the slots 34 and 35 whose walls extend slightly out of the vertical. In the side plates 25 and 26 are the holes 36 and 37, and 36' and 37' at the end 30 and 38 and 39, and 38' and 39' at the end 33 of the frame 24. The slots 31 and 32 and 34 and 35 are in horizontal alignment.

Slidably received on the lower surface 40, of the top 27, of the frame 24, are the spring plates 41 and 42 which are received between the side plates 25 and 26. The upper ends 41' and 42' of the spring plates 41 and 42 are curved outwardly and contact the frame 24 at the ends 30 and 33, respectively, of the frame. The lower ends 43 and 44, of the springs, are looped and respectively are received in the slots 45 and 46 of the anchor 47 which is fixed to the upper surface 48 of the support 13 as by the bolts 49, whereby the lower ends 43 and 44, of the spring plates 41 and 42, are fixed in contact with each other and fixed to the support 13. The lower ends 43 and 44, of the spring plates 41 and 42, have a pivotal movement with respect to the anchor 47, and the ends 41' and 42' normally move in opposite directions, and from each other, when the anchor 47 is forced upwardly. When the anchor is forced downwardly the ends 41' and 42' move toward each other.

For the purpose of forcing the upper ends of the flexible spring plates 41 and 42 in contact with the top 27, of the frame 24, the shoes 50 and 51 are positioned between the side plates 25 and 26 at the ends 30 and 33 of the frame.

The upper sides 52 and 53, of the shoes 50 and 51, have the curved offsets 54 and 55 therein, whereby the ends 56 and 57 of the shoe 50 contact the lower and outer surface of the spring plate 41 and the ends 58 and 59 of the shoe 51 contact the lower and outer surface of the spring plate 42. Received through the holes 60 and 61, in the shoes, are the pins 62 and 63 whose outer ends, respectively, are slidably received in the slots 31 and 32, and 34 and 35, whereby the shoes are permitted to move in the direction at which the walls of the slots extend.

Received between the side plates 25 and 26, at the ends 30 and 33, of the frame 24, are the plugs 64 and 65 having received therethrough the holes 66 and 67 and 68 and 69 in which are received the pins 70, 71, 72, and 73 respectively. The outer ends of the pins 70 and 71 are received in the holes 36 and 37 and 36' and 37' in the side plates 25 and 26 and at the end 30 of the frame 24. The outer ends of the pins 72 and 73 are received in the holes 38 and 39, and 38' and 39' in the side plates 25 and 26 at the end 33 of the frame 24.

Threaded in the holes 74 and 75 in the lower ends of the plugs 64 and 65 are the thumb-screws 76 and 77 whose upper ends are adapted, when the thumb-screws are screwed upwardly, to contact the lower surfaces of the shoes 50 and 51 adjacent the upper ends thereof, and slightly outwardly and above the adjacent slots in the side plates.

The operation of the invention is as follows:

Assume that the shock absorber 1 and the various parts thereof are positioned as shown in Fig. 2. If it is desired to increase the force required to pull the spring plates 41 and 42 downwardly, in a predetermined period of time, the thumb-screws 76 and 77 are manually screwed inwardly and upwardly, thereby causing their upper ends to force the shoes 50 and 51 upwardly and inwardly which decreases the radius of the curves 78 and 79, respectively, in the upper ends 41' and 42', respectively, of the spring plates 41 and 42. When the seat part 3 is forced downwardly the ends 41' and 42', of the spring plates, are caused to slide outwardly from the ends 30 and 33 of the frame 24, thereby causing less pressure or frictional contact of the outer surfaces of the spring plates in contact with the lower ends 56 and 58 of the shoes 50 and 51 which relieves the frictional contact of the upper ends 57 and 59 of the shoes with the outer surfaces of the spring plates, since the shoes pivot on the pins 62 and 63, whereby a relatively small force is required to cause the seat board 3 to move downwardly and permit the ends 41' and 42' of the spring plates 41 and 42 to move outwardly from the ends 30 and 33 of the frame 24.

When for any reason the seat board 3 is caused to move upwardly the downward pull of the springs 41 and 42 on the lower ends 56 and 58 of the shoes 50 and 51 causes the shoes to pivot and increase the frictional engagement of the upper ends 57 and 59 of the shoes with the spring plates 41 and 42. This is true because upward movement of the seat board 3 causes the spring plates 41 and 42 to bind the lower ends of the shoes 50 and 51 and the shoes are caused to pivot on the pivots 62 and 63 thereby causing the upper ends 57 and 59 of the shoes to move inwardly and upwardly and increase the frictional engagement of the upper ends of the shoes with the spring plates 41 and 42. The amount of force required to cause the seat board 3 and the support 13 to move from each other in a given period of time depends upon the adjusted position of the thumb-screws 76 and 77, because when the thumb-screws are screwed inwardly the shoes 50 and 51 are forced upwardly in engagement with the spring plates thereby reducing the radius of the curved portions of the springs and causing the shoes to engage the outer surfaces of the spring plates with greater frictional contact than if the thumb-screws were screwed outwardly in which position the radius of the curved portions 78 and 79 is gradually increased. The lower ends of the spring plates remain in contact with each other.

In Fig. 11 is shown a modification of the view, or shock absorber 1, whose construction is identical with the form shown in Figs. 1 to 10 inclusive, except that the frame 24 is connected with the lower surface 80 of the side channel 81 of the chassis 82 of the automobile 83, and the anchor 47 is connected with the axle 84. The invention, when used in this manner, will absorb shocks and vibrations ordinarily imparted to the automobile body by the wheels of the vehicle.

An advantage of the invention is that slidable movement of the spring plates 41 and 42 in contact with the shoes 50 and 51 and the upper surface of the top 27, of the frame 24, is unlikely to cause any noticeable wear of the parts for a considerable period of time particularly for the reason that the plates 41 and 42 are formed from steel and the shoes 50 and 51 may be formed from any suitable material, such as brass, aluminum, bronze, or the like.

Another advantage of the invention is that the shock absorber 1 may be quickly and conveniently connected for the purpose of absorbing shocks of the seat 2 or the chassis 82 of the motor vehicle 83, and after it is attached thereto and the thumb-screws 76 and 77 are properly adjusted it will operate without requiring any adjustment for a long period of time.

Still another advantage of the invention is that the force required to separate the frame 24 from the anchor 47 in a given period of time may be readily changed by manually adjusting the thumb-screws 76 and 77, whereby the same size of the shock absorber 1 may be utilized under various circumstances and conditions with different kinds of seats, vehicles, and the like.

While I believe that the form of the invention illustrated in the drawings and referred to in the above description, as the preferred embodiment, is efficient and practicable, yet realizing that the conditions concurrent with the adoption of the device will necessarily vary, I desire to emphasize the fact that changes in the details may be resorted to, when required, without sacrificing any of the advantages of the invention as defined in the claims.

Various changes may be made in the general form and arrangement of mechanical parts described without departing from the invention. Hence I do not limit myself to the precise details of the materials or the size and shape thereof as set forth, but consider myself at liberty to make such changes and alterations as fairly fall within the spirit and scope of the appended and final claims.

What I claim as new and desire to secure by Letters Patent is:

1. In a shock absorber, a frame comprising a horizontal top and vertical spaced apart sides integrally connected with said top, said sides having slots therein, a pair of vertical spring steel plates having their upper ends curved outwardly and being received in said frame and between said sides and in contact with said top, a pair of shoes having offsets in their upper sides and the ends of said shoes being in frictional contact with the upper and outer sides of said plates, pins received through said shoes and the outer ends of said pins being slidably received in said slots, manually operative means to adjust the pressure exerted by said shoes on said plates, and means to fix the lower ends of said plates to each other, and means to anchor the lower ends of said plates.

2. In a shock absorber, a frame comprising a horizontal top and vertical spaced apart sides integrally connected with said top, said sides having slots therein, a pair of vertical spring steel plates having their upper ends curved outwardly and being received in said frame and between said sides and in contact with said top, a pair of shoes having offsets in their upper sides and the ends of said shoes being in frictional contact with the upper and outer sides of said plates, pins received through said shoes and the outer ends of said pins being slidably received in said slots, manually operative means to adjust the pressure exerted by said shoes on said plates, and means to anchor the lower ends of said plates.

3. In a shock absorber, a frame comprising a horizontal top and vertical spaced apart sides integrally connected with said top, a pair of vertical spring steel plates having their upper ends curved outwardly and being received in said frame and between said sides and in contact with said top, a pair of shoes and the ends of said shoes being in frictional contact with the upper and outer sides of said plates, manually operative means to adjust the pressure exerted by said shoes on said plates, and means to fix the lower ends of said plates to each other to retain said lower ends in fixed relation with each other.

4. In a shock absorber, a frame comprising a top and spaced apart sides integrally connected with said top, a pair of vertical spring steel plates having their upper ends curved outwardly, the lower ends of said plates being in contact with each other and exerting pressure on each other and the area of the contacting surfaces of said lower ends being variable, and being received in frictional contact with said frame, a pair of shoes being in frictional contact with the sides of said plates, means to adjust the pressure exerted by said shoes on said plates to regulate the pressure of said plates with respect to said frame.

5. In a shock absorber, a frame comprising a top and spaced apart sides integrally connected with said top, said sides having slots therein, a pair of vertical spring steel plates having their upper ends curved outwardly, a pair of shoes having offsets in their upper sides and said shoes being in frictional contact with the sides of said plates, pins received through said shoes and the outer ends of said pins being slidably received in said slots, means to adjust the pressure exerted by said shoes on said plates, and means to fix the lower ends of said plates to each other, and means to anchor the lower ends of said plates.

6. In a shock absorber, a frame comprising a top and spaced apart sides integrally connected with said top, a pair of vertical spring steel plates having their upper ends curved outwardly and in contact with said frame, a pair of shoes being in frictional contact with the sides of said plates, and forcing said plates in frictional contact with said frame, and means to adjust the pressure exerted by said shoes on said plates.

7. A shock absorber comprising a receiving member, a pair of flexible plates slidably mounted in contact with said member and being curved, ends of said plates being in contact with each other and in connected relation with each other, the other ends of said plates adapted to move in opposite directions and from each other and means to force portions of said plates in frictional contact with said member, whereby the force required to slide said plates with respect to said members is dependent upon the frictional engagement of said plates with said member and the operation of said absorber is dependent upon said plates remaining in contact with each other.

8. A shock absorber comprising a frame, a pair of flexible plates slidably received in contact with said frame, means to retain said plates in frictional contact with said frame and exerting pressure on said plates, portions of said plates being curved when retained in contact with said frame, and ends of said plates being connected, whereby the force required to move said plates in frictional contact with said frame is dependent upon the pressure of said first mentioned means on said plates and upon the contact of said plates on said frame and upon the pressure exerted by said ends with respect to each other, and manually operative means to adjust the frictional contact of said first mentioned means with said plates.

9. In a shock absorber, a frame having sides having slots therein, a pair of vertical spring steel plates being received in said frame and between said sides, a pair of shoes having offsets in their upper sides and the ends of said shoes being in frictional contact with the upper and outer sides of said plates and forcing said plates in curved positions, the lower ends of said plates being in contact with each other and portions of said plates being retained in frictional contact with said frame, pins received through said shoes and the outer ends of said pins being slidably received in said slots whereby said shoes are movable, manually operative means to adjust the pressure exerted by said shoes on said plates, and means to fix the lower ends of said plates to each other.

10. In a shock absorber, a frame having sides having slots therein, a pair of vertical spring steel plates being received in said frame and between said sides, a pair of shoes being in frictional contact with the upper and outer sides of said plates and forcing said plates in curved positions, the lower ends of said plates being in contact with each other and portions of said plates being retained in frictional contact with said frame, pins received through said shoes and the outer ends of said pins being slidably received in said slots whereby said shoes are movable, manually operative means to adjust the pressure exerted by said shoes on said plates.

11. In a shock absorber, a frame having sides, a pair of vertical spring steel plates being received in said frame and between said sides, a pair of shoes being in frictional contact with the upper and outer sides of said plates and forcing said plates in curved positions, the lower ends of said plates being in contact with each other and portions of said plates being retained in frictional contact with said frame, manually operative means to adjust the pressure exerted by said shoes on said plates.

12. In a shock absorber, a frame, a pair of flexible plates slidably received in frictional contact with said frame, said plates being in curved positions and with ends extending from each other, the other ends of said plates being in contact with each other, and exerting pressure onto each other, means to retain said plates in contact with said frame whereby when pressure in one direction is exerted on said second mentioned ends of said plates the plates are caused to slide on said frame and said first mentioned ends move from each other and the area of the contacting surfaces of said plates is reduced, and when pressure in the opposite direction is exerted on said second mentioned ends said first mentioned ends move toward each other and the area of the contacting surfaces of said plates is increased, and means to increase and reduce to force required to slide said plates on said frames.

13. In a shock absorber, a frame, a pair of flexible plates slidably received in frictional contact with said frame, said plates being in curved positions and with ends extending from each other, the other ends of said plates being in contact with each other, means to retain said plates in contact with said frame whereby when pressure in one direction is exerted on said second mentioned ends of said plates the plates are caused to slide on said frame and said first mentioned ends move from each other and the area of the contacting surfaces of said plates is reduced, and when pressure in the opposite is exerted on said second mentioned ends said first mentioned ends move toward each other and the area of the contacting surfaces of said plates is increased.

14. In a shock absorber, a pair of flexible longitudinal means, a support for said means, means to slidably retain said means in curved positions in contact with said support and with ends of said first mentioned means in contact with each other and exerting pressure on each other.

GEORGE E. SMITH.